United States Patent [19]
Frey

[11] Patent Number: 5,138,638
[45] Date of Patent: Aug. 11, 1992

[54] SYSTEM FOR DETERMINING THE NUMBER OF SHOPPERS IN A RETAIL STORE AND FOR PROCESSING THAT INFORMATION TO PRODUCE DATA FOR STORE MANAGEMENT

[75] Inventor: Ronald G. Frey, Hackensack, N.J.

[73] Assignee: Tytronix Corporation, Fairfield, N.J.

[21] Appl. No.: 640,272

[22] Filed: Jan. 11, 1991

[51] Int. Cl.$^5$ .......................... G07C 9/00; G06M 3/00
[52] U.S. Cl. ......................................... 377/6; 340/545; 340/556; 250/221; 377/53
[58] Field of Search ...................... 377/6, 53; 250/221; 340/545, 552, 555, 556

[56] References Cited

U.S. PATENT DOCUMENTS

| | | | |
|---|---|---|---|
| 4,021,644 | 5/1977 | Dreslinski | 377/6 |
| 4,278,878 | 7/1981 | Kato | 377/6 |
| 4,356,387 | 10/1982 | Tsubota et al. | 377/6 |
| 4,700,295 | 10/1987 | Katsof et al. | 377/6 |
| 4,719,363 | 1/1988 | Gallacher | 340/555 |
| 4,868,901 | 9/1989 | Kniskern et al. | 377/6 |
| 4,949,074 | 8/1990 | D'Ambrosia et al. | 340/552 |
| 4,993,049 | 2/1991 | Cupps | 377/6 |

Primary Examiner—John S. Heyman
Attorney, Agent, or Firm—Rogers, Howell & Haferkamp

[57] ABSTRACT

A system for automatically counting people as they move past a selected location, and for measuring their heights. The system includes emitters for emitting beams toward persons moving past a selected location to generate reflected beams from the person, such that the included angle of the emitted and reflected beams is a function of the person's height. A detector detects the reflected beams and generates signals representative of the included angle, and thus representative of the height of the person. The signals representative of the height of the person are converted to data that may be used for evaluation purposes. The system is particularly adaptable for use in retail stores for determining the number of shopper units in the store during selected time periods and evaluating store performance based, in part, on the conversion of shopper units to actual customers.

22 Claims, 4 Drawing Sheets

SYSTEM FOR DETERMINING THE NUMBER OF SHOPPERS IN A RETAIL STORE AND FOR PROCESSING THAT INFORMATION TO PRODUCE DATA FOR STORE MANAGEMENT

BACKGROUND AND SUMMARY OF THE INVENTION

This invention is generally directed to a system for counting people, such as at a store location, but more particularly is directed to a system for determining the number of shoppers in a retail store and for processing that information to produce data for store management. Still more particularly, the system of the present invention is directed to determining the number of shopper units in a retail store, and the people that comprise those shopper units. By "shopper units" is meant those persons who are potential customers, i.e., may be expected to make purchases in the store. For example, it is not uncommon for a parent to shop with young children. The parent and children as a group would constitute a single shopper unit because the young children themselves would not be expected to make a purchase.

Knowing the number of shopper units in a store, in contrast to the number of people in the store, is valuable store management information. With selected criteria, such as height categories, the system of the present invention can count the persons as they enter and leave a store location, such as a doorway, measure the heights of the persons, and using selective criteria generate data for use in store management. For example, such data may include the number of shopper units in the store at selected time intervals. Also, using height criteria, the system will discriminate between persons and objects such as shopping carts or the like. For example, the system can be programmed to detect a shopping cart by measuring the height of the cart and recognizing the length of time that the system detects that height as the cart moves past the system detector. The system will also detect the direction of movement of the person along the person's path of travel at the store location, e.g., whether the person is entering or leaving the store. Hence, the system can determine the number of persons or shopper units in the store at any given time.

Systems or devices for counting people as they move past a location are known. Tsubota U.S. Pat. No. 4,356,387 discloses a counting system for counting persons of a minimum height using a radiant energy emitter and a radiant energy receiver. The radiant energy is infrared. The system screens height by prefocusing the emitter and setting the emitter and detector angle so that the two intersect at some point in space in the portal. This permits screening out objects or persons shorter than the point of intersection to allow the counting of only those objects or persons that are above the selected height. However, it does not count or give height information on objects or persons below the selected threshold. Another problem with the device of the Tsubota patent is that each installation must be precisely aligned and carefully aimed so that the point of intersection of the emitter beam with the reception path of the receiver is at the desired minimum height above the floor.

Zepke U.S. Pat. No. 4,799,243 discloses a person counting device by detecting the presence of thermal radiation from the body. It includes an infrared detector but no emitter. When a living object passes through a portal, it radiates infrared energy that is detected by the device, the device thereby detecting the presence of a person walking through the portal. The device of Zepke does not discriminate by or measure height.

Mizukami U.S. Pat. No. 4,733,081 is directed to an apparatus for sensing a body by detecting the difference between the reflected amount of infrared rays directed to the body as against the background.

Shahbaz U.S. Pat. No. 4,528,679 is directed to an automatic counting systems for passengers. The device is primarily for counting passengers entering or leaving a common carrier such a bus. The device comprises stations located at the steps of the bus where the stations include ultrasonic transducers. Ranging circuits each include a transmitting circuit for generating a pulse to be transmitted by each associated transducer, and receiving circuit for receiving and detecting the echo signal received through the transducer. A pulse count is generated that is directly proportional to the distance from the transducer to the object from which the echo has returned. The logic circuit operates to determine the presence or absence of a passenger under each station on the basis of a range distance measurement of less than a predetermined distance corresponding to the presence of a passenger of a height greater than a predetermined height. Hence, the system detects the number of passengers over a preselected height, but ignores all persons below the threshold height level.

Koelsch U.S. Pat. No. 4,847,485 discloses an arrangement for determining the number of persons within a space using infrared sensors. The system does not include emitters or any means for determining the heights of the persons, or using that information to provide management data.

So while systems or devices for counting people or for counting people over a selected height were known, none of these systems provide the necessary height measurement for all persons passing through a selected location, and for using that information to generate data for use, such as by retail store managers, to evaluate store performance and the like. For example, such information may include the number of shopper units in the store during selected time intervals and the composition of the shopper units, i.e. adults and children. Knowing the number of children and adults in each shopper unit is useful to store management in evaluating and improving store performance.

The present invention is particularly directed to use in retail stores for generating information on the number of persons in the store at selected time intervals, the categories of those persons, and the way in which those categories relate to actual store performance. Obviously, the primary objective of any retail establishment is to maximize sales. This includes converting shoppers to actual customers. In other words, the objectives are to attract persons to the store, and once in the store convert them to customers. Hence, the shopper-to-customer "conversion rate" is the percentage of shoppers that actually make purchases.

For an accurate measure of conversion rate it is not enough to merely count persons as they enter and leave the store. This is because not all persons who enter the store are potential customers. As mentioned previously, many such persons may be young children who are unlikely to make any purchases themselves. Hence, it is important to distinguish between persons who are potential customers, and those that are not. This may be done using height criteria. The system of the present invention not only counts persons as they enter and leave a selected location, but also "measures" the heights of the persons and converts that information to the number of shopper units using height criteria.

Although it is important to identify the number of persons who are potential customers, it is also important to know the number of such persons who are not. Such information is useful for a wide variety of store evaluation purposes.

The system of the present invention performs its functions without interfering in any way with the store traffic, and without requiring any involvement of store personnel. It operates fully automatically without the shoppers even knowing of its existence. It generates highly reliable count information of in and out shopper flow. The optics module device may be mounted overhead such as above a doorway where the customers enter and leave the store. On wide doorways multiple optics modules may be used at selected spaced intervals to insure that all shoppers entering and leaving the store are detected. The information from the optics module is communicated to a central processing unit (CPU) which interprets the data from the optics module, such as determining the height category of the person and whether the person is entering or leaving the store. The data, in turn, may be transmitted to the store controller or in-store processor (ISP). Data from the system of the present invention is integrated with data from the store's point of sale (POS) system and other store computer management systems which provide number of sales (customers), dollar sales, times of sales, locations of sales, sales categories, labor hours, and so on. From this combined information numerous management reports may be generated to assist management in evaluating store performance. Using this information store management can identify problem areas and take corrective measures to improve store performance. Realistic performance goals can be established for each store taking into account the number of shopper units available to the store. The information may also be used to optimize staffing for greater service, increase conversion rates, and improve dollar volume per transaction.

From data generated from the system of this invention together with data from other store systems including the POS system, advertising and special event effectiveness may be evaluated. Controlled tests can be conducted in paired media markets to accurately measure the increased traffic created by individual ads, multimedia campaigns, sales events, or specific promotions. For example, it can be determined whether the advertising or special events delivered increased shopper units, and whether such increase in shopper units resulted in the expected increased sales. The system may be used to measure the impact of competitors' advertising on a store's performance, and data from the system may be used to assist in evaluating the impact of the store's appearance, layout, and merchandise presentation. Data from the system may be used in determining the effectiveness of in-store promotions as well as merchandise placement within the store. From this, the store management may determine whether the store is merchandising effectively or if a new department or service is generating interest. The optics module may be placed in sensitive areas of the store, such as the cash office, stockroom, or the like, to monitor traffic in those areas, alerting the management to unusual patterns of activity.

Most importantly, the system of the present invention when used with other store systems, such as the POS system, provides great versatility in generating information to increase store sales.

Generally, the system of the present invention comprises one or more optics modules located at one or more selected locations at store entrances or exits, or within the store. The number of optics modules at each location depends on the width of the entrance or exit. The module is located above the passageway. Each optics module has means for emitting beams toward persons moving past a selected location to generate reflected beams from those persons. The included angle of the emitted and reflected beams is a function of the height of the person. The optics module further includes means for detecting the reflected beams and generating signals representative of the included angle, and thus the height of the person. These signals are transmitted to a signal processor, and from there to a central processing unit (CPU), which processes the signals and generates data representing the number of persons in preselected categories. Such categories may include the number of shopper units in the store during any given time interval. The emitted and reflected beams are infrared, and the detector is a position sensitive detector which generates a signal in response to the position that the reflected beam strikes the detector which is indicative of the height of the person from which the reflected beam is reflected.

Where multiple optics modules are used at a given location, or where optics modules are used at several locations, the signals from the optics modules may be multiplexed and all processed by a single signal processor and CPU.

In a preferred embodiment of the invention, each optics module generates at least two emitter beams which are generated alternately, and where the emitted beams are generated from different locations along the path of movement of the person. The reflected beam is detected at a location along the path of movement that lies between the locations from which the emitted beams are generated. In this way a single detector may be used for each optics module rather than a plurality of detectors, and yet the direction of travel of each person may be detected.

The CPU also receives data from the store POS system, and may receive data from other store computer systems as well, and generates information from the combined data to assist store management in evaluating store performance. Such information may be stored or displayed on a suitable display device such as a CRT or printer.

These and other features and advantages of the invention are apparent from the drawings and description to follow.

DETAILED DESCRIPTION OF THE PREFERRED EMBODIMENT

Figure 1:
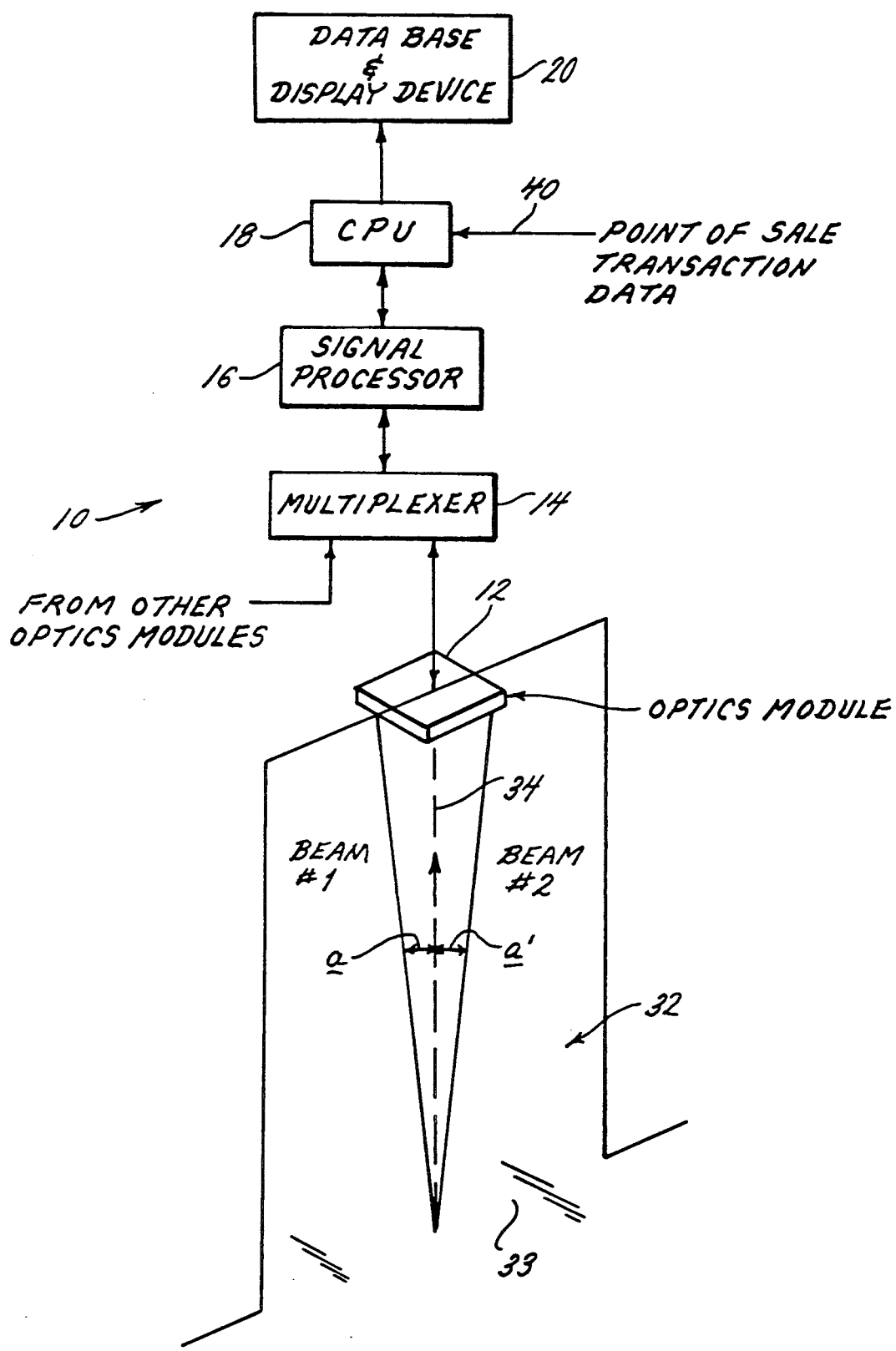
FIG. 1 is a schematic illustrating the system of the present invention, and illustrating a single optics module located at a doorway through which persons enter and exit.

With reference to FIG. 1 there is shown a system 10 of the present invention which comprises an optics module 12, a multiplexer 14, a signal processor 16, a CPU 18, and a database and display device 20. The optics module 12 is mounted so that it is located above the persons entering or leaving the doorway 22 or other locations. Hence, it may be mounted in the ceiling, or on a suitable wall bracket that properly locates the module at the top of the doorway. The module may be mounted directly at the top or somewhat in front or behind the door so long as its beams are directed downwardly toward the persons as they enter and exit through the doorway.

Figure 2:
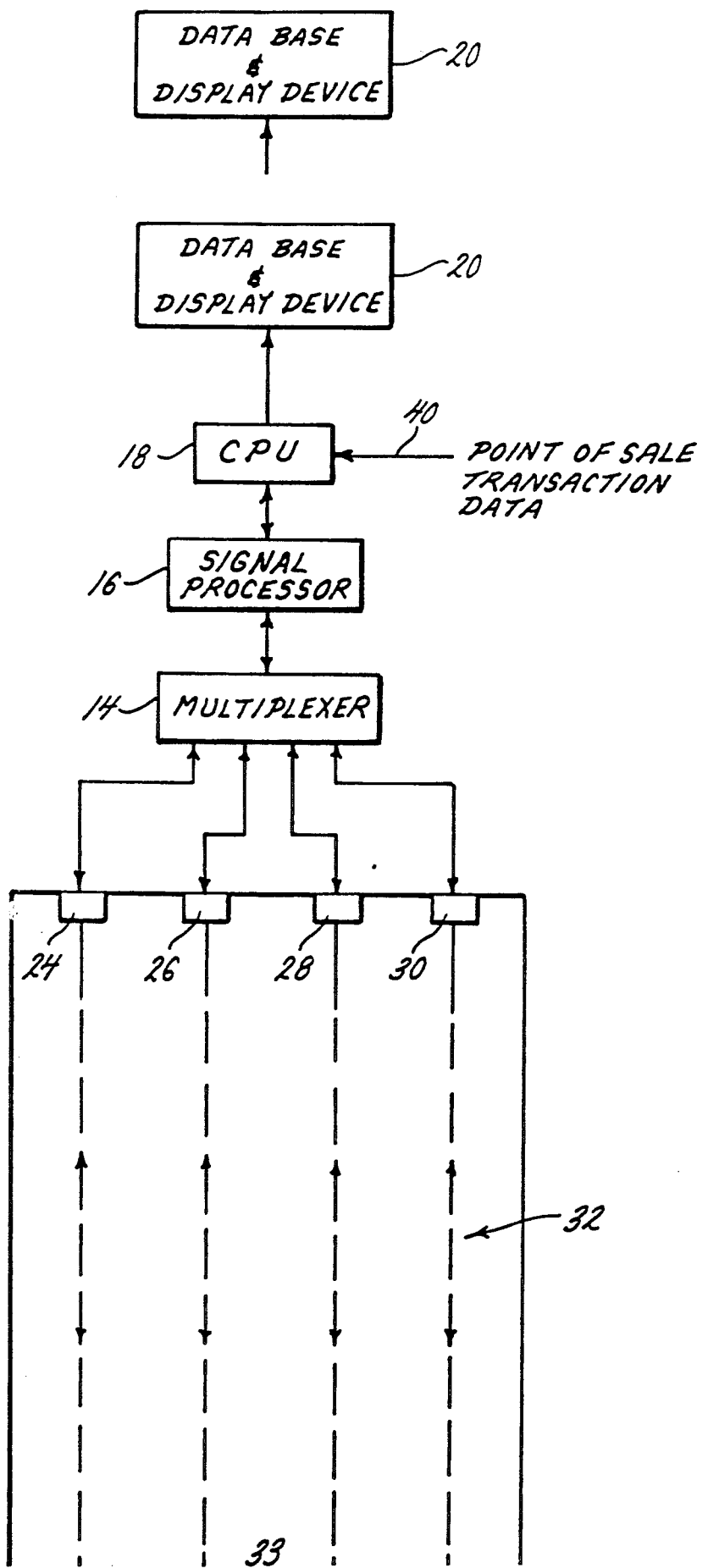
FIG. 2 is a schematic illustrating the invention and showing multiple optics modules in a doorway.

In FIG. 1 a single module is shown but multiple modules may be used as illustrated in FIG. 2. Where a doorway or other location is sufficiently wide that persons entering or exiting through the doorway or passage may miss the beams, multiple modules are placed at selected intervals to insure that emitted beams strike each person entering or exiting through the passage. Hence, in FIG. 2 optics modules 24, 26, 28, and 30 are located across the width of a doorway 32. Each of the modules 28–30 operates in the same manner as the module 12 in FIG. 1 to emit beams and detect reflected beams as will be further explained.

The spacing between the modules 24–30 should be such as will insure that each person passing through the doorway is detected while minimizing the number of optics modules used. For example, a suitable spacing may be about 15 inches, although the spacing may be varied as appropriate. Furthermore, while four such modules are shown, it is to be understood that any number of modules may be used depending on the size of the passageway.

Returning now to FIG. 1, the optics module 12 preferably emits two infrared beams, No. 1 and No. 2. Upon each of these beams hitting an object, such as the floor 33, or a person entering or leaving through the doorway, a reflected beam 34 is generated. As will be more fully explained with reference to FIG. 3, the included angle a between beam No. 1 and its reflected beam 34, or the included a' between the beam No. 2 and its reflected beam 34, is indicative of the height of the person or object passing through the doorway. The taller the person or object that passes through the doorway, the greater will be the included angle a or a'. The optics module generates signals representative of the height of the person or object passing through the doorway, which signals are fed to the signal processor 16 by way of a multiplexer 14.

The purpose of the multiplexer 14 is to multiplex the signals from the optics module 12 with signals from other like optics modules that may be used at the same doorway or at other passageways. The signal processor 16 will be more fully described with reference to FIG. 4. Generally, signals are fed between the signal processor and the CPU 18. The CPU receives data from other store computers such as transaction data from the store POS system as indicated at 40. The CPU generates data from the signals, from the signal processor representing the counts and heights of persons entering and leaving through the passageway, and from the data generated by the other store computer systems for use by store management as heretofore explained. The data from the CPU is stored and displayed as indicated at 20.

Figure 3:
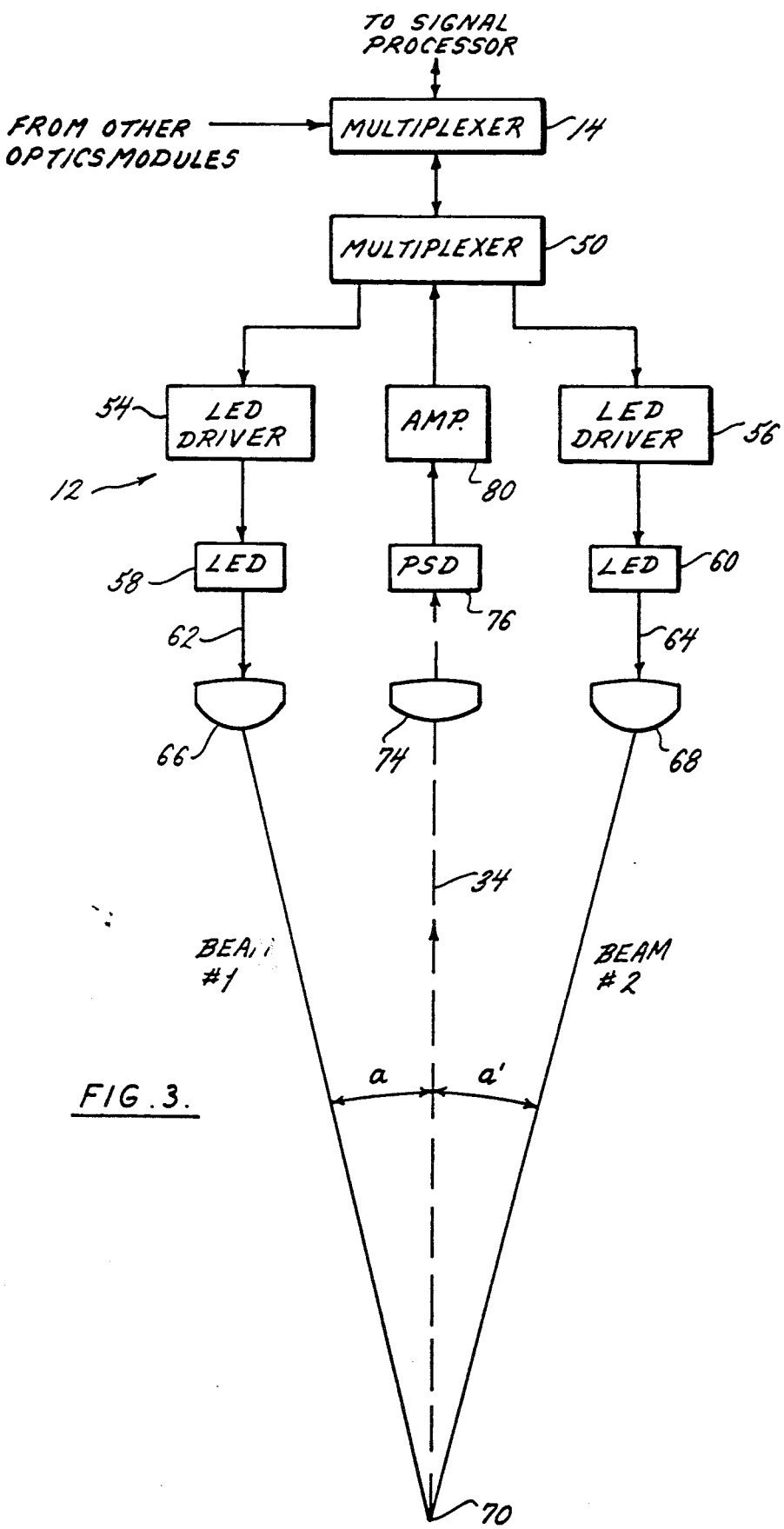
FIG. 3 is a schematic further illustrating an optics module in accordance with the present invention.

FIG. 3 illustrates a typical optics module which may be any of the modules 12 or 24–30. In a preferred embodiment of the invention each optics module includes a multiplexer 50 which multiplexes signals between the multiplexer 14 and the LED drivers and detectors. The multiplexer 14, in turn, multiplexes signals to and from the signal processor 16, so that in effect signals are multiplexed between the signal processor and the various LED drivers and detectors.

Figure 4:
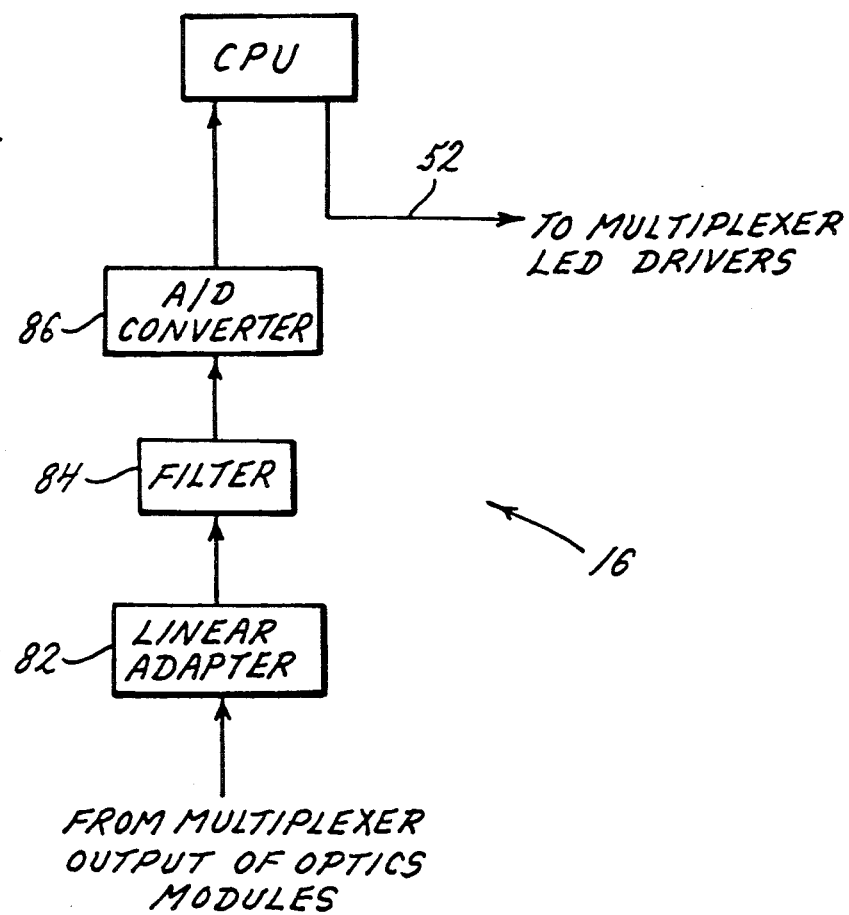
FIG. 4 is a schematic illustrating a signal processor used with the present invention.

Hence, by way of the multiplexers the signal processor receives signals from the CPU and transmits those signals as shown at 52 in FIG. 4 to a pair of infrared LED drivers 54 and 56 of the optics module. These drivers drive LED's 58 and 60, respectively, which emit infrared beams 62 and 64 through suitable lenses 66 and 68. The lenses 66 and 68 focus the beams, designated beam No. 1 and beam No. 2, at a selected location, such as the location 70. For example, the location 70 may be a distance of 12 feet from the lenses, although of course other distances could be used depending on the height of the doorway, ceiling, or the like. The location 70 may be at the floor level.

When either beam No. 1 or beam No. 2 strikes the floor or location 70, a reflected infrared beam 34 is generated. The reflected beam passes through a lens 74 and impinges on a position sensitive detector (PSD) 76. The PSD is a device that generates a signal indicative of the position at which the reflected beam 34 strikes the PSD. Such a device has a detecting surface such that if the beam strikes the surface at a particular location, which may be a central location, the PSD generates at its output a certain voltage level. The voltage level changes depending on the distance away from center that the beam strikes the detecting surface. Hence, the voltage level at the output of the PSD is indicative of the position at which the beam strikes the detecting surface of the PSD.

The output of the PSD is amplified at 80, and the amplified signal is fed by way of the multiplexers 50 and 14 to the signal processor 16. More specifically, with reference to FIG. 4, the amplified signal is fed to a linear adaptor 82. The amplified signal from the PSD is not linear. That is, the amplitude of the signal is not linearly proportional to the position at which the reflected beam impinges on the detecting surface of the PSD. The purpose of the linear adaptor 82 is to linearize that signal.

The linearized signal from the linear adaptor 82 is fed to a filter 84 which filters out noise from other infrared sources. The output of the filter is fed to an analog-to-digital converter 86 that converts the analog signals from the PSD, as linearized and filtered, to digital signals that are fed to the CPU. The CPU is of a standard configuration including a microprocessor, bus, memory, driving controls, clock, and oscillator. The CPU is equipped with several types of communication ports so that it will accept data from the store's existing POS system. When a transaction occurs at a register in the store, that transaction is recorded, the record of that transaction is sent to the POS system, and from there is transmitted to the CPU 40. The data transmitted from the POS system on each transaction includes the time of day, the day of the week, the amount of the transaction, and the location in the store where the transaction occurred. That data is combined with the data from the signal processor 16 to provide the desired information for store management.

During the same time that the CPU receives digital signals from the converter 86, it also generates the necessary control signals to the drivers 54 and 56 to modulate the LED's 58 and 60 and generate beams No. 1 and No. 2.

Figure 5:
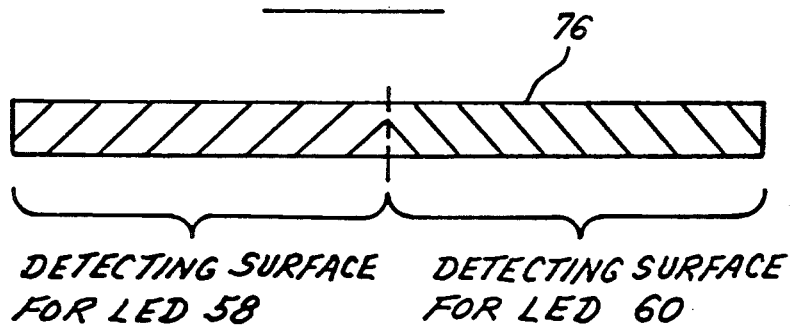
FIG. 5 is a diagram illustrating the operation of the position sensitive detector in accordance with one embodiment of the invention.

In accordance with a preferred embodiment of the invention, beams No. 1 and No. 2 are not generated simultaneously. Instead, the generation of one is alternated with that of the other so that at any given instant of time only one such beam is generated and only one reflected beam 34 is detected at the PSD 76. Also, in accordance with a preferred embodiment of the invention, each LED and its respective reflected beam uses a different half of the PSD. For example, the emitter 58 and its reflected beam 34 may use the left half of the detecting surface of the PSD 76, and the emitter 60 and its reflected beam 34 may use the right half. This is illustrated in FIG. 5. In other words, the reflected beams from the LED 58 strike the detecting surface of PSD 76 anywhere from the center to the far left, while the reflected beams from the LED 60 strike the detecting surface of PSD 76 anywhere from the center to the far right. The output voltage will be proportional to the distance from center that the reflected beam strikes, although not necessarily linearly proportional. Using this arrangement, a ranging distance from four to twelve feet from the lenses may be achieved.

As an alternate embodiment, each optics module may include two PSD's as well as two LED's, with each LED having a corresponding PSD. However, this embodiment results in increased costs due to the additional PSD. Hence, with the preferred embodiment the generation of the emitter beams is alternated, and the PSD is effectively split, so that only one PSD is needed. Also, by splitting the PSD and alternating the generation of the emitted beams, only three rather than four lenses are needed with each optics module. The multiplexer 50 facilitates the alternate generation of the emitted beams which occurs at high speed. For example, each beam may be generated 30 times per second.

Beams No. 1 and No. 2 are emitted from spaced locations along the path of travel of persons moving through the passageway. For illustration, FIG. 3 exaggerates the spacing between the lenses 66, 74, and 68 relative to the lengths of the beams. In actual practice the lenses may be only a couple of inches apart.

In operation, suppose a person enters through the doorway of FIG. 1 from left to right along a path of travel. In doing so the person will break beam No. 1 which will strike the person at head level and produce a reflected beam. The included angle a between beam No. 1 and the reflected beam will be proportional to the height of the person. The reflected beam will pass through the lens 74 and will impinge on the detecting surface of PSD 76 at a location that is proportional to the included angle. This will generate a signal at the output of the PSD that is proportional to the height of the person. That signal is linearized and filtered, as previously explained, and converted to a digital signal that is fed to the CPU. A similar signal is produced when the person interrupts beam No. 2. The generation of signals indicative of the person's height occurs when the person enters or exits through the doorway. The reason for having two emitted beams is so that the system can detect the direction the person travels through the doorway, and can thus determine the number of persons in the store.

As a person enters through the doorway from left to right as viewed in FIG. 1, the person first interrupts beam No. 1, then simultaneously interrupts beam No. 2, then beam No. 1 becomes uninterrupted, and finally beam No. 2 becomes uninterrupted. When a person exits through the doorway, the reverse occurs. First beam No. 2 is interrupted, then beam No. 1 is simultaneously interrupted, then beam No. 2 becomes uninterrupted, and finally beam No. 1 becomes uninterrupted. The CPU detects these sequences of events and determines the direction of travel of the person in response to these sequences. In this way the CPU keeps count of the number of persons in the store, and further keeps count of the number of persons of selected height categories in the store.

The PSD 76, and the infrared LED's 58 and 60 are available from Hamamatsu Corporation, as are the lenses 66, 68, and 74. The signal processor circuitry is also available from Hamamatsu Corporation, and may be type No. C3683-01. An alternate signal processor circuitry available from Hamamatsu Corporation is its type No. H2476-01. The type C3683-01 is less sophisticated, but is lower cost and will perform the basic height measurement and detection functions in accordance with the present invention.

By way of example, the lenses 66 and 68 for the emitter, may have focal lengths of 13 mm. The lens 74 for the PSD may have a focal length of approximately 18 mm. The shorter focal length for the emitter lenses is recommended to provide higher output, while the longer focal length lens for use with the PSD will avoid some measuring error.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A system for automatically counting people or objects as they move past a selected location, and for measuring their heights, said system comprising:
   means for emitting beams toward a person or object moving past a selected location to generate reflected beams from said person or object, the included angle of an emitted and reflected beam being a function of the height of the person or object;
   position detecting means for detecting said reflected beams and generating signals that vary in response to the positions at which the reflected beams strike the detecting means, said signals thereby being representative of the included angle and thereby representing a height profile of the person or object from which the beams are reflected; and
   means for converting said signals to data representing the number of persons or objects in a selected category.

2. The system of claim 1 wherein said beams are infrared beams.

3. The system of claim 2 wherein said detecting means further comprises a position sensitive detector.

4. The system of claim 1 wherein said location has at least one optics module, said module further comprising at least one infrared light emitting diode and corresponding lens for generating and directing at least one infrared beam from a location above the person or object as the person or object moves past said location downwardly toward the floor, and at least one infrared beam position sensitive detector for detecting a reflected beam generated upon an emitted beam striking a person or object, said position sensitive detector generating a signal in response to the position that the reflected beam strikes the detector which is indicative of the height of the person or object from which the reflected beam is reflected.

5. The system of claim 4 wherein said location has multiple optics modules spaced at selective intervals.

6. The system of claim 4 wherein said optics module has at least two infrared light emitting diodes and corresponding lenses for generating at least two infrared beams from a location above the person or object as the person or object moves past said location downwardly toward the floor, the generation of the emitted beams being alternate, and wherein said emitted beams are generated from different locations along the path of movement of said person or object.

7. The system of claim 6 wherein said reflected beam is detected at a location along the path of movement that lies between the locations from which the emitted beams are generated.

8. The system of claim 6 further comprising means for detecting the direction that each person or object travels along the path of movement, said means being responsive to the sequence in which the emitted beams strike a person or object as the person or object moves along the path.

9. A system for automatically counting people or objects as they move past a selected store location, such as a doorway or other location, for measuring their heights, and for determining the number of shopper units in the store during selected periods of time, said system comprising:

at least one optics module at said location, said optics module having at least two infrared light emitting diodes and corresponding lenses for generating and directing at least to infrared beams from a location above the person or object as the person or object moves past said location downwardly toward the floor, and at least one infrared beam position sensitive detector for detecting the positions of reflected beams generated thereon upon emitted beams striking a person or object, said position sensitive detector generating signals that vary depending on the positions on the detector at which the reflected beams strike the detector as a person or object moves past said selected location for generating signals representing a height profile of the person or object from which the beams are reflected; and
means for converting said signals to data representing the number of shopping units based on preselected criteria.

10. The system of claim 1 wherein said detector means further comprises a position sensitive detector for detecting the reflected beams and generating signals that vary depending on the positions on the detector at which the reflected beams strike the detector.

11. The system of claim 9 wherein said store location has multiple optics modules spaced at selected intervals.

12. The system of claim 9 wherein the generation of the emitted beams is alternate, and wherein said emitted beams are generated from different locations along the path of movement of said person or object.

13. The system of claim 12 wherein said reflected beam is detected at a location along the path of movement that lies between the locations from which the emitted beams are generated.

14. The system of claim 12 further comprising means for detecting the direction that each person or object travels along the path of movement, said means being responsive to the sequence in which the emitted beams strike the person or object as the person or object moves along the path.

15. A system for automatically counting people or objects as they move past a selected location, for measuring their heights, and for integrating the count and height information with data from a point-of-sale system to generate information for store management: said system comprising means for emitting beams toward persons or objects moving past a selected location to generate reflected beams from said persons or objects;
means for detecting said reflected beams and for generating signals representative of the heights of said persons or objects;
means for converting said signals to data representing the number and heights of said persons or objects;
means for integrating said number and height data with data from a store point-of-sale system; and
means for generating data for use in store management in response to said integrated data.

16. The system of claim 15 wherein said detecting means further comprising means for generating signals representative of the included angles of the emitted and reflected beams, said included angles being a function of the height of the persons or objects.

17. The system of claim 16 wherein the beams are infrared beams, and wherein the detecting means further comprises a position sensitive detector.

18. The system of claim 17 wherein said location has at least one optics module, said module further comprising at last one infrared light emitting diode and corresponding lens for generating and directing at least one infrared beam from a location above the person as the person or object moves past said location downwardly toward the floor, and at least one infrared beam position sensitive detector for detecting a reflected beam generated upon an emitted beam striking a person or object, said position sensitive detector generating a signal in response to the position that the reflected beam strikes the detector which is indicative of the height of the person or object from which the reflected beam is reflected.

19. The system of claim 18 wherein said location has multiple optics modules spaced at selective intervals.

20. The system of claim 18 wherein said optics module has at least two infrared light emitting diodes and corresponding lenses for generating at least two infrared beams from a location above the person or object as the person or object moves past said location downwardly toward the floor, the generation of the emitted beams being alternate, and wherein said emitted beams are generated from different locations along the path of movement of said persons or objects.

21. The system of claim 20 wherein said reflected beam is generated at a location along the path of movement that lies between the locations from which the emitted beams are generated.

22. The system of claim 20 further comprising means for detecting the direction that each person or object travels along the path of movement, said means being responsive to the sequence in which the emitted beams strike a person or object as the person or object moves along the path.

* * * * *